(12) United States Patent
Addison

(10) Patent No.: US 12,104,796 B2
(45) Date of Patent: Oct. 1, 2024

(54) MODULAR FIRESTARTER ASSEMBLY

(71) Applicant: John Addison, Atlanta, GA (US)

(72) Inventor: John Addison, Atlanta, GA (US)

(*) Notice: Subject to any disclaimer, the term of this patent is extended or adjusted under 35 U.S.C. 154(b) by 30 days.

(21) Appl. No.: 17/848,956

(22) Filed: Jun. 24, 2022

(65) Prior Publication Data

US 2023/0417416 A1 Dec. 28, 2023

Related U.S. Application Data

(63) Continuation-in-part of application No. 17/675,849, filed on Feb. 18, 2022, now Pat. No. 11,619,389.

(60) Provisional application No. 63/174,898, filed on Apr. 14, 2021.

(51) Int. Cl.
*F24B 15/00* (2006.01)
*C10L 11/04* (2006.01)
*C10L 11/08* (2006.01)

(52) U.S. Cl.
CPC ............ *F24B 15/005* (2013.01); *C10L 11/04* (2013.01); *C10L 11/08* (2013.01); *C10L 2230/06* (2013.01); *C10L 2230/20* (2013.01)

(58) Field of Classification Search
CPC ...... C10L 1/026; C10L 1/1608; C10L 1/1905; C10L 1/191; C10L 10/06; C10L 10/08; C10L 10/12; C10L 2200/0446; C10L 2230/20; C10L 2290/24; C10L 2290/34; C10L 1/106; C10L 1/125; C10L 1/1832; C10L 1/1881; C10L 1/1985; C10L 1/2225; C10L 1/328; C10L 10/02; C10L 2250/084; C10L 2250/086; C10L 2270/026; C10G 2300/4012; C10G 2400/04; C10G 29/22; C10G 31/08; B01J 19/008; B01J 19/10; B01J 19/18; B01J 3/08; B01F 23/413; B01F 23/4145; B01F 25/46; F24B 15/005

See application file for complete search history.

(56) References Cited

U.S. PATENT DOCUMENTS

| | | | |
|---|---|---|---|
| 8,365,907 B1 | 2/2013 | Mooney | |
| 2019/0315510 A1* | 10/2019 | Kozolup | ................. C10L 11/06 |
| 2021/0380896 A1* | 12/2021 | Barth | ..................... F24B 1/191 |

FOREIGN PATENT DOCUMENTS

| | | | | |
|---|---|---|---|---|
| CA | 2757732 A1 * | 5/2012 | ............ | A47J 37/079 |
| IL | 224794 A1 | 6/2014 | | |
| WO | WO03080770 A1 | 10/2003 | | |
| WO | WO2017165905 | 10/2017 | | |
| WO | WO-2017165905 A1 * | 10/2017 | .............. | C10L 11/04 |

OTHER PUBLICATIONS

Final Office Action issued in corresponding U.S. Appl. No. 17/675,849 on Oct. 28, 2022; 9 pages.

* cited by examiner

*Primary Examiner* — Latosha Hines
(74) *Attorney, Agent, or Firm* — Smith Gambrell & Russell LLP

(57) ABSTRACT

A modular firestarter assembly. The modular firestarter assembly includes a number of modular components configured to be able to join to one another to form the firestarter assembly. The modular components can be broken down to save space. The modular firestarter assembly can be formed from a number of different combinations of the modular components to hold fuel sources and assist in starting a fire.

18 Claims, 14 Drawing Sheets

MODULAR FIRESTARTER ASSEMBLY

CROSS REFERENCE TO RELATED APPLICATIONS

This application is a continuation-in-part of U.S. application Ser. No. 17/675,849 filed on Feb. 18, 2022, which claims benefit of and priority to U.S. Provisional Patent Application No. 63/174,898 filed on Apr. 14, 2021, and which is incorporated by reference in its entirety.

FIELD OF INVENTION

This invention generally relates to firestarters.

BACKGROUND OF THE INVENTION

The need for aid in starting fires is long felt as many individuals utilize firestarters. An efficient firestarter is one that uses the least amount of material possible to achieve the primary goal of all firestarters, which is to ignite external natural fuel sources such as twigs, limbs and logs for a sustained fire. While firestarters of the prior art achieve this primary goal successfully, they are relatively inefficient and limited for individuals looking for a lighter, more packable, more customizable, and yet equally effective solution.

One of the main limitations of common firestarters is their basic structural shape. The majority of these firestarters are similar in shape regardless of material composition—a shape that resembles a dense solid block, briquette, or rope of extruded or molded material whether organic or chemically derived. These densely solid firestarters require more material than necessary in most occasions and result in a relatively heavier product that can be cumbersome to pack or stow. Their solid shape also requires more effort from the user to structure or build up externally sourced kindling for a sustained fire, requiring more skill and effort from novice fire builders.

Few current firestarters have an advanced shape or structural design outside of the basic solid block variations described above. These conventional and basic structural designs are unable to improve material efficiency by harnessing natural fire growth tendencies such as breathability, height, and surface area exposure of natural fuel sources. They are also structurally limited from offering further improved features of an advanced design such as the ability to act as a template or guide for the user in the organization of natural fuel sources, superior packability when not in use, and customizability based off weather conditions and skill level.

With the rise of ultralight camping sports where every ounce and packability matters, there is relevance and need for a significantly lighter, more packable, and more efficient firestarter that is equally effective while remaining equally affordable to current solutions. There is also need for a firestarter that acts as a template or guide for the user that effectively aids in the organization and structuring of natural fuel sources for a sustained fire, particularly for users that are less skilled in the art of fire making.

Further, these one size fits all firestarters prevents efficient use of such materials, especially for those who are more experienced at starting fires, and largely do not take into consideration the conditions in which the fire is being started (e.g., dry conditions with no wind v. wet conditions v. windy conditions).

Therefore, there is a need for a more efficient firestarter that uses less material while implementing an advanced design that provides the user with more efficiency, customizability and functionality for starting a fire.

SUMMARY OF THE INVENTION

The present disclosure relates to an apparatus to be used as a firestarter. The firestarter may be modular in nature according to an aspect of the present invention. The firestarter can be configured to hold a plurality of natural fuel sources. In an aspect, the firestarter can be a fuel source itself. In an aspect, the firestarter can include several modular components that allow for a plurality of configurations for the firestarter when in use. The components contain at least three sides with a plurality of apertures configured to hold fuel sources. The components have been configured to contain coupling means to connect at least two modular components at the side. The coupling means allow for the modular components to facilitate embodiments of the firestarter assembly that can construct a variety of three-dimensional shapes, including polyhedrons.

The firestarter may also include a single modular component configured to be folded into a configuration. The foldable modular component includes a plurality of portions. The foldable modular component contains coupling means to connect at least two individual portions to each other to form a variety of three dimensional shapes, including polyhedrons.

In an aspect, the present disclosure relates to a firestarter assembly. The firestarter assembly can include a modular component that can be used by itself or with other modular components to assist with starting a fire. The firestater assembly includes a plurality of portions with multiple apertures throughout each. In such aspects, each portion has at least three sides, and can be an equilateral triangle or another equilateral polyhedron. In such aspects, each portion is connected to at least one other portion directly. In such cases, the portions are configured to fold along their connected sides. The connected sides may have slits or perforations amongst them to facilitate folding.

Further, the firestarter assembly includes a coupling means used to connect two (e.g., first and second portions) of the plurality of portions to one another. The coupling means can include male and female joints along sides of a first and second portion. The male and female joints are oriented in the same fashion along each side of the portions. The joints engage with other corresponding joints to couple portions. When coupled, the firestarter assembly may take on the form of a three sided equilateral pyramid. When coupled, sets of apertures of separate portions align with the same sets of apertures of a corresponding portion.

In addition, each portion of the firestarter assembly includes multiple apertures throughout. Apertures located throughout the plurality of portions may come in two distinct sizes. Portions further contain tapered corners to allow for ease of ignition of the assembly. In an aspect, a firestarter assembly can be made of a fire conducive material or a material that is treated to be fire conducive. In other aspects, a firestarter assembly can be made of a non-combustible material.

In an aspect, a firestarter assembly, as described above, can be used to start a fire by setting up the firestarter assembly and igniting the firestarter assembly with a fire starting source. In such an aspect, a firestarter assembly can be assembled by folding one or more portions of the plurality of portions along a side, and coupling portions together through coupling means, as to raise the assembly above a surface. Fuel sources can either be inserted into the firestarter assembly or omitted. The assembly can then be ignited using a fire starting source.

The firestarter assembly improves ease of starting fires through various means including the optimization of air flow, fire height, and the like.

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The accompanying drawings are included to provide a further understanding of the invention and are incorporated in and constitute part of this specification, as well as illustrate several embodiments of the invention that together with the description serve to explain the principles of the invention.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures, and techniques have been shown in detail in order not to obscure an understanding of this description.

In order to achieve the primary goal of all firestarters with less material and therefore weight while increasing firestarter size, shape, and volume (and therefore potential flame output) the present invention is a firestarter with superior structural and geometrical shape that is designed off of 4 major considerations: 1) the natural characteristics and tendencies of fire 2) the abundance of natural fuel sources found in many backyards, camping areas, and primitive wilderness settings 3) the need for an ultralight and packable solution that can flatly lay in the palm of one's hand or fit flatly in one's pocket or backpack and 4) the need for a solution that can be assembled in multiple configurations of increasing effectiveness based off of weather conditions and individual skill level. As such, the present disclosure relates to improved material efficiency through harnessing natural fire growth tendencies such as breathability, height, and surface area exposure of natural fuel sources. The present disclosure also relates to a template or guide for the user in the organization of natural fuel sources, superior packability when not in use, and customizability based off weather conditions and skill level, as disclosed further herein.

Figure 1A:
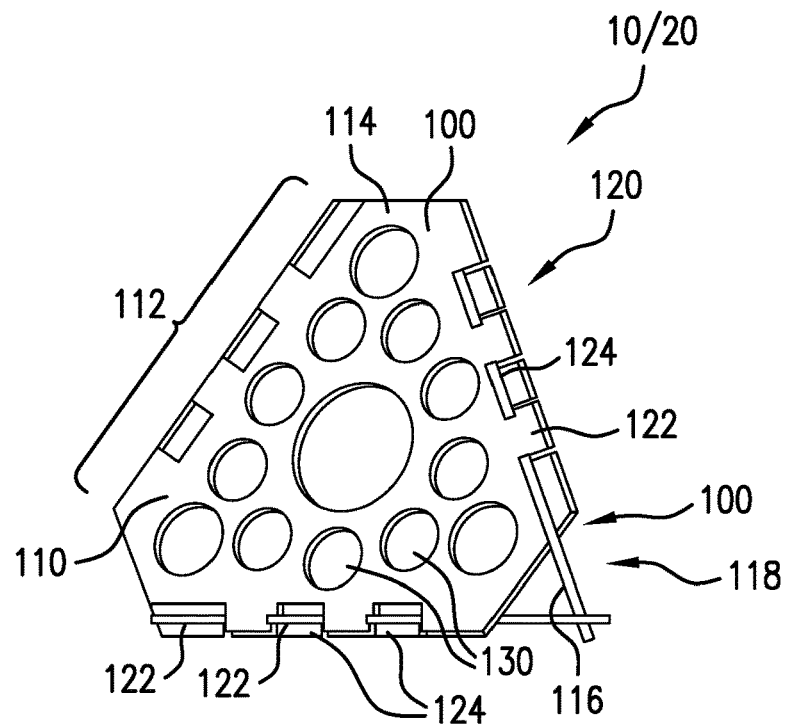
FIGS. 1A-1E show multiple side plan views (FIGS. 1A-1C), a top plan view (FIG. 1D), and a bottom plan view (FIG. 1E) of a firestarter according to an aspect of the present invention.
Figure 1B:
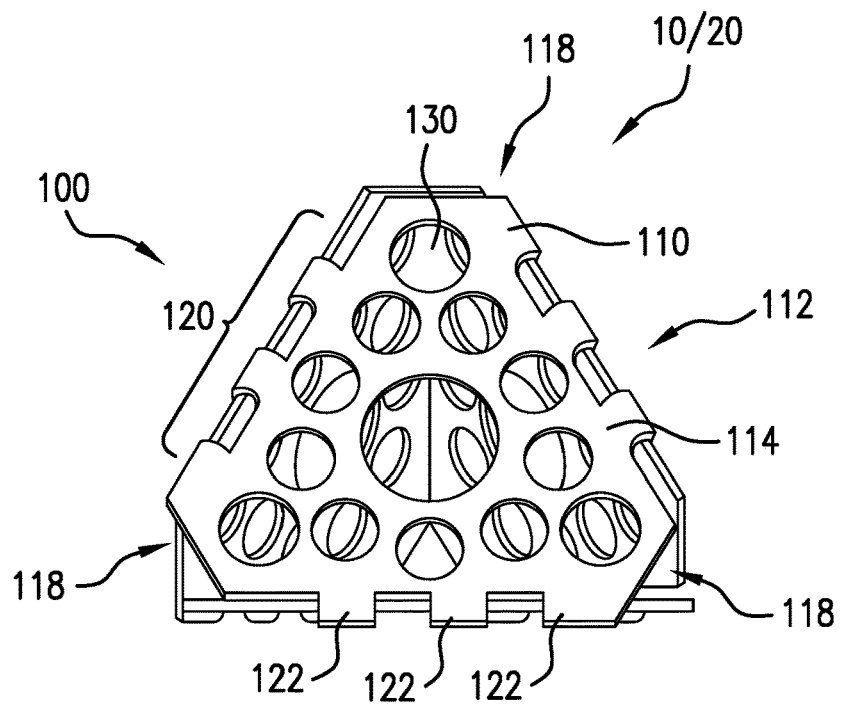
Figure 1C:
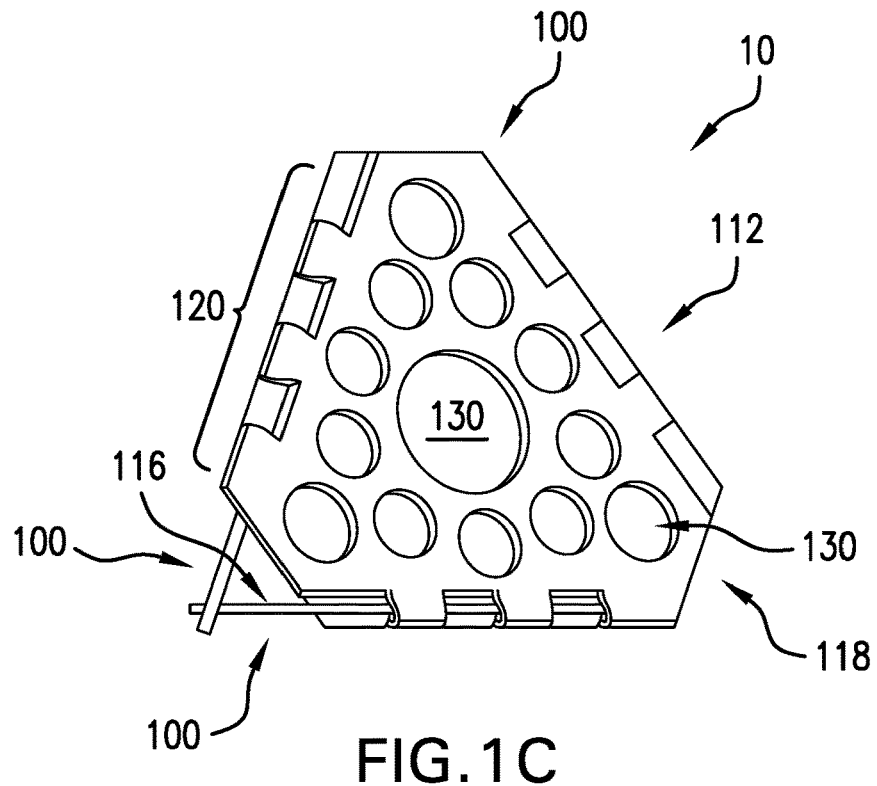
Figure 1D:
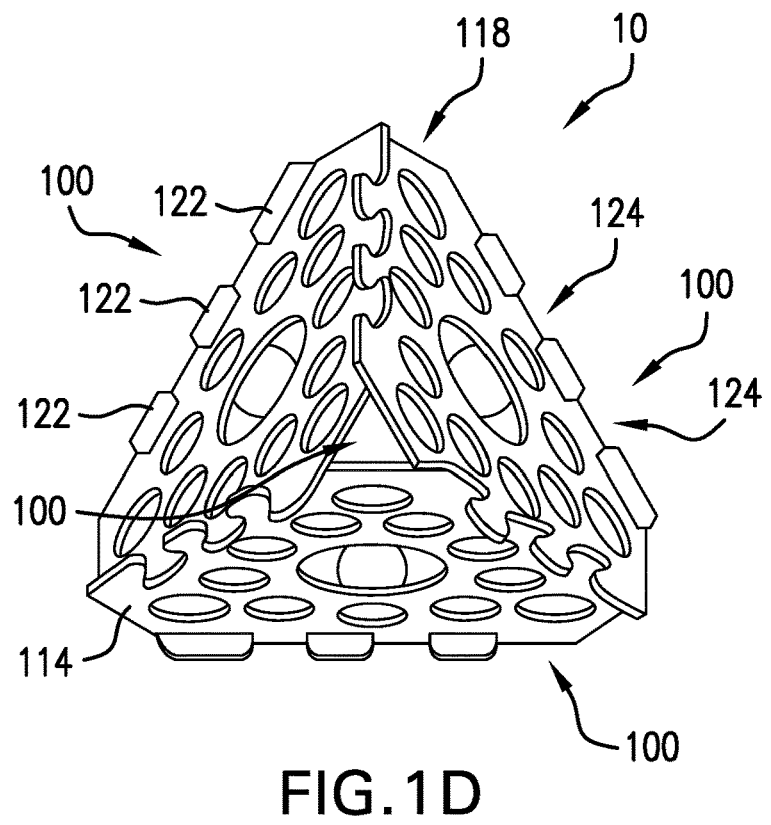
Figure 1E:
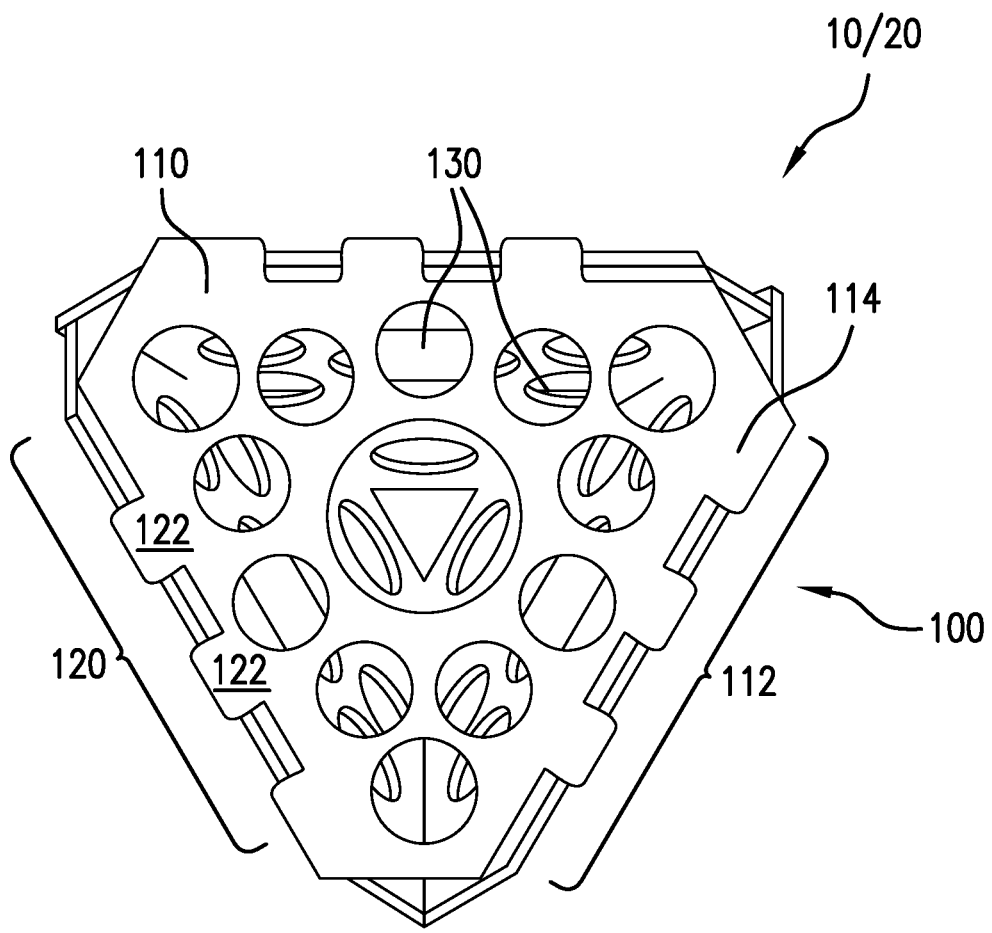
Figure 2:
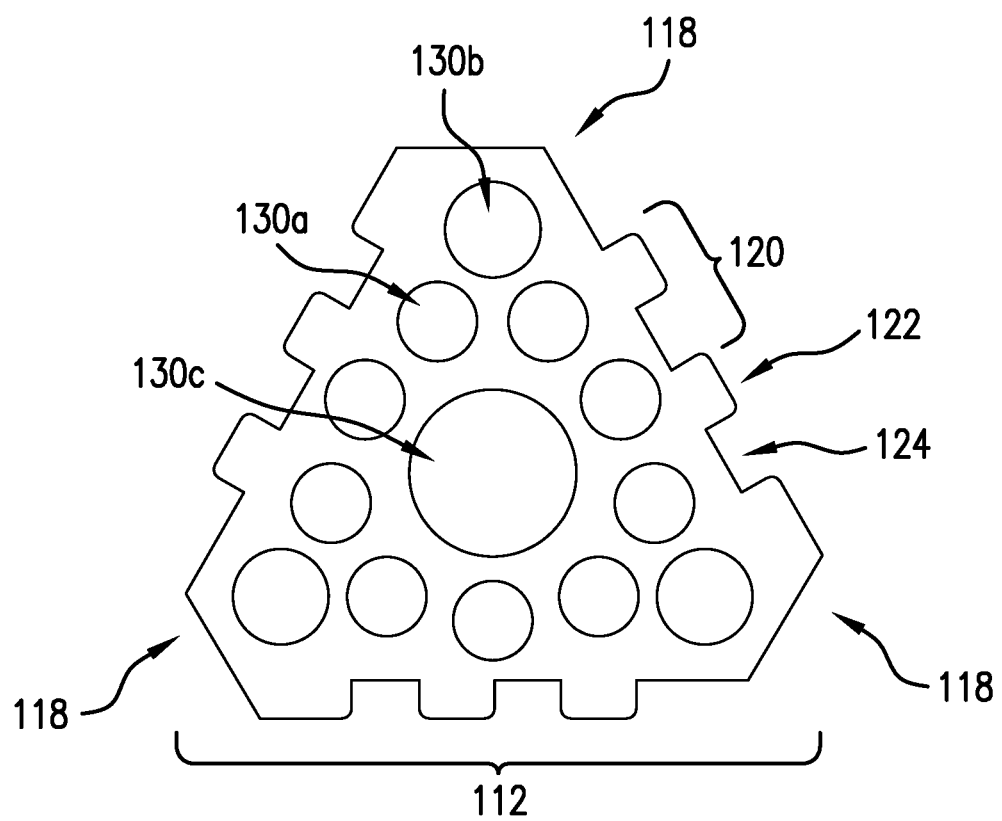
FIG. 2 displays a modular component 100 according to an aspect of the present invention.

In an aspect, the invention is directed towards a firestarter assembly 10 as shown in FIGS. 1-6. As shown, the firestarter assembly 10 is configured to hold other fuel sources 50 for a fire. While it is desirable for the fuel source to be natural, the firestarter assembly 10 can utilize other fuel sources 50, such as natural materials (e.g., twigs, branches, etc.) or chemical materials potentially subject to processing. In an aspect, the firestarter assembly 10 includes a modular component 100 as shown in FIG. 2. In some aspects, the firestarter assembly 10 includes multiple modular components 100. The modular components 100 include a body 110.

In an aspect, the body 110 can be made of a fire conducive material, or is treated to be fire conducive. For example, the material of the body 110 can include, but is not limited to, paperboard, chipboard, wood, wood or plant fibers, cloth, solid chemical fuels, and the like. In an aspect, the paperboard can be non-corrugated and thick. In an aspect, the use of non-corrugated material allows for ease of assembly of the modular components 100 of firestarter assembly 10, via durable joints (discussed below) while presenting a solid, rigid, and flexible material that burns well. In an aspect, the use of thick paperboard offers a rigid, flexible and burnable raw material that can be easily die cut into desirable shapes to form the modular components 100 of the firestarter assembly 10 as discussed below. In an aspect, the material of the body can be treated, or left untreated. Such treatment can include coating the material. The coating can include wax, oils, or other compounds that increase combustibility or to provide water resistance and prolonged burn time. In an aspect, the material used to form the body 110 of the modular component 100 of the firestarter assembly 10 is treated after the modular component 100 is formed. In other aspects, the material can be treated before the modular components 100 are formed. However, treating body 110 of the modular component 100 after it is formed can ensure that all of the surfaces are treated, as well as reduce waste of the treatment on removed material.

In an aspect, the body of 110 of the modular component 100 can be made of non-combustible material. In an aspect, the non-combustible material can be chosen from metal, fiberglass, heat-resistant polymers, and the like. The use of a non-combustible material facilitates a re-usable embodiment of the firestarter assembly 10. Such a reusable firestarter assembly 10 aids fire starting for users of various expertise levels by aiding in the structure of the fire. Fuel sources 50 may be placed in the non-combustible components 100 in a manner that increases early fire growth by enhancing air flow, height, and other characteristics necessary to create fire.

In other aspects, the firestarter assembly 10 may utilize a combination of combustible modular components 100 and non-combustible, reusable modular components 100, discussed in more detail below. In such aspects, a firestarter assembly 10 may utilize only combustible modular components or only non-combustible modular components 100.

Figure 3:
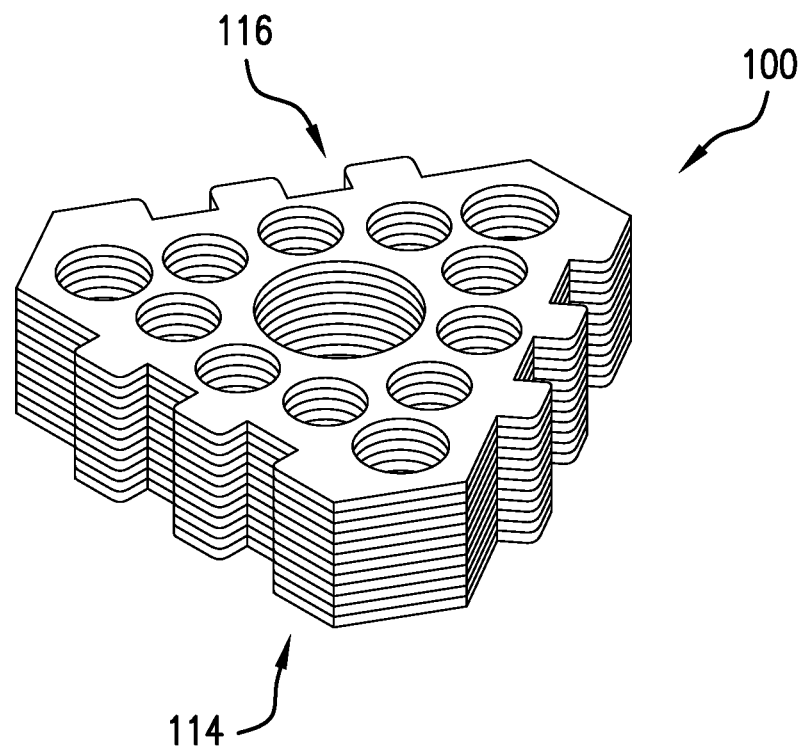
FIG. 3 is a top plan view of multiple modular components of the firestarter of FIGS. 1A-E.

In an aspect, as shown in FIG. 2, the body 110 of the modular components 100 is a polygon, having at least three sides/edges 112. In such aspects, it is possible for sides 112 of a wide variety of shapes of bodies 110 to share an entire length of a side 112 to form a connected edge, as described herein. In addition, the body 110 includes a front surface 114 and a back surface 116 as shown in FIG. 3. Each modular component 100 is configured to be joined with other modular components 100 to form a polyhedron 20, as shown in FIGS. 1A-1E, when all sides 112 of each modular component 100 are joined to sides 112 of other modular components 100 through coupling means 120, discussed below. In some aspects, the edges 112, absent the coupling means 120, of the bodies 110 of the modular components 100 are substantially straight, and are substantially the same length. In such instances, having modular components 100 with bodies 110 of the same dimensions allows for easy of manufacture, storage, and configuration (i.e., assembly). Further, in some of these instances, corners 118 of the bodies 110 can have a rounded shape, allowing for easier assembly, and additional benefits discussed below. In other aspects, the bodies 110 of the modular components 100 can have various shapes amongst themselves.

For example, as shown in in FIG. 2, the body 110 is a triangle. In some exemplary aspects, the triangle has three sides 112 of the same length, forming an equilateral triangle. Other embodiments may have different lengths amongst their sides 112. Having uniform side lengths, however, allows for uniform modular components 100 which assists in assembly and manufacturing. Uniform modular components allows for a uniform polyhedron 20, which can make assembly easy, as well as use with fuel sources 50. When four equilateral triangular modular components 100 are joined together, as shown in FIGS. 1A-1E, they form a pyramid polyhedron 20. In other aspects, the body 110 of the modular component 100 can be formed from other polygon shapes which lead to other polyhedrons being formed when all edges 112 are connected. For example, squares, pentagons, hexagons, and the like can be used to form cubes, pentahedron, hexahedron, and the like (see FIGS. 10A-10G discussed further herein).

As discussed above, each modular component 100 includes coupling means 120 that allows each side 112 to be joined to another side 112 of another modular component 100. In an aspect, the coupling means 120 can include a joint system 120, as shown in FIG. 2. The joint system 120 can be shared amongst sides 112 of the modular components 110. For example, the joint system 120 can be made of multiple male joints 122 along sides 112 that form female joints 124. The male joints 122 of a first modular component 110 are configured to be received by female joints 124 of a second modular component 110, and the male joints 122 of the second modular component 110 are configured to be received by the female joints 124 of the first modular component 110, as shown in FIGS. 1A-1E. As shown in FIG. 2, each side can be configured to have two male joints 122 and two female joints 124, though in other embodiments, various other combinations, in number and in types of joints, can be utilized.

In other aspects, various numbers of male joints 122 and female joints 124 can be utilized, and in different combinations. For example, if the body 110 has a square shape, it is possible that one pair of opposite sides 112 includes two male joints 122 and one female joint 124, and the other pair of opposite sides 112 includes one male joint 122 and two female joints 124. In odd number sides, the same distribution of male/female joints can be used.

Further, in other aspects, other coupling means can be utilized. For example, tongue and groove coupling means, tab/insert means, and various other configurations can be utilized. However, the male/female joint does provide an ease of assembly and manufacturing. Regardless, the coupling means should still allow joining of the modular components 110 over a range of degrees, including at least an approximate 90° angle as well as other angles conducive to constructing three-dimensional structures.

As shown in FIGS. 1A-1E, 2, and 5A-D, each modular component 100 includes a number of apertures 130 within the body 110. As discussed above, the apertures 130 are configured to hold, organize and structure additional fuel sources 50 in an optimized fashion conducive to early fire growth. The fuel sources 50 can include natural fuel sources 50 such as twigs and other wood-based products traditionally used in fires. In an aspect, the apertures 130 can be of various sizes. As shown in FIG. 2, the apertures 130 include small apertures 130a, medium apertures 130b, and large apertures 130c. The various sizes allow for the fire assembly 10 to hold fuel of various sizes. In addition to holding fuel sources 50, the apertures 130 increase the amount of air that any initial fire is exposed to, which can increase the efficiency and heat of the fire that is started, ensuring a better burn.

In addition, the various apertures 130 are found throughout the body 110 of the modular component of the fire assembly 10. When the fire assembly 10 is assembled (discussed below), the apertures 130 of one modular component 100 can be utilized with corresponding apertures 130 of other modular components 100 to retain fuel sources 50. When at least two modular components 100 are used to form the fire assembly 10, fuel sources 50 can be fed into apertures 130 of different modular components 100, which can raise the fuel source off of the ground, adding in the building of the fire. In such aspects, inserted fuel sources 50 can be easily ignited by any ignition source including but not limited to a match or lighter. This can be done quickly. In addition, those fuel sources 50 inserted into apertures 130 found higher along the modular components 100 (i.e., apertures 130 found near sides 112 opposite a side 112 placed on the surface/ground) will be preheated before catching fire. This increases the chances of a steady flame being produced. A lit assembly 10 can then be used to further ignite firewood, charcoal, paper, kindling wood, fatwoods, or anything of the like to create a larger fire if needed. In an aspect, the plurality of apertures 130 are oriented across modular components 110 in a similar fashion. In other words, apertures 130 are located at the same positions on each modular component 110.

As discussed above, the firestarter assembly 10 can be made of various combinations of modular components 100 when used to start a fire. For example, when the body 110 of the modular component 100 has a triangular shape, a user can use one, two, three, or four modular components 100 to use the firestarter assembly 10, as discussed below. The number of modular components 100 used can be dependent on the experience of the user and the conditions in which the fire is attempted to be made.

Figure 5A:
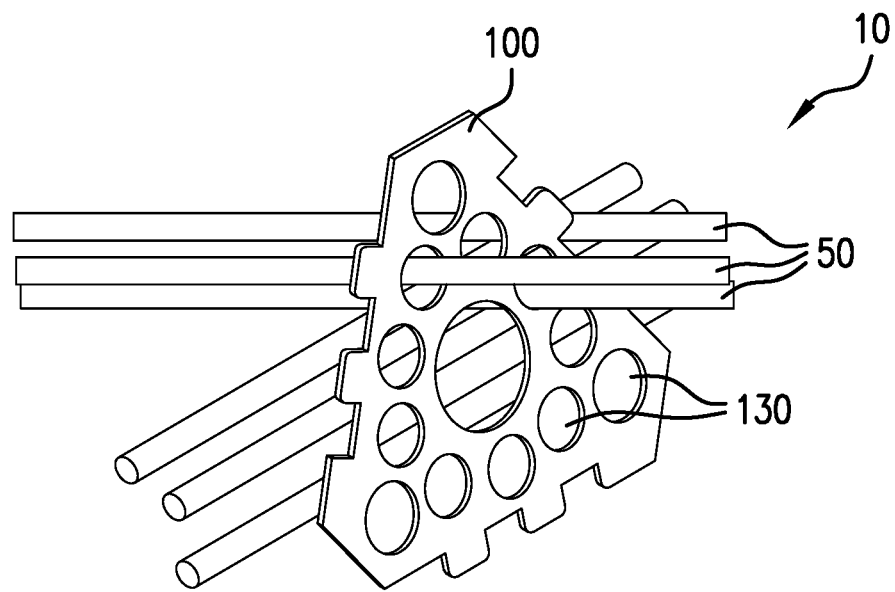
FIGS. 5A-5D display various configurations of modular components (one (FIG. 5A), two (FIG. 5B), three (FIG. 5C), or four (FIG. 5D)) of the firestarter of FIGS. 1A-1E holding fuel sources according to an aspect of the present invention.
Figure 5B:
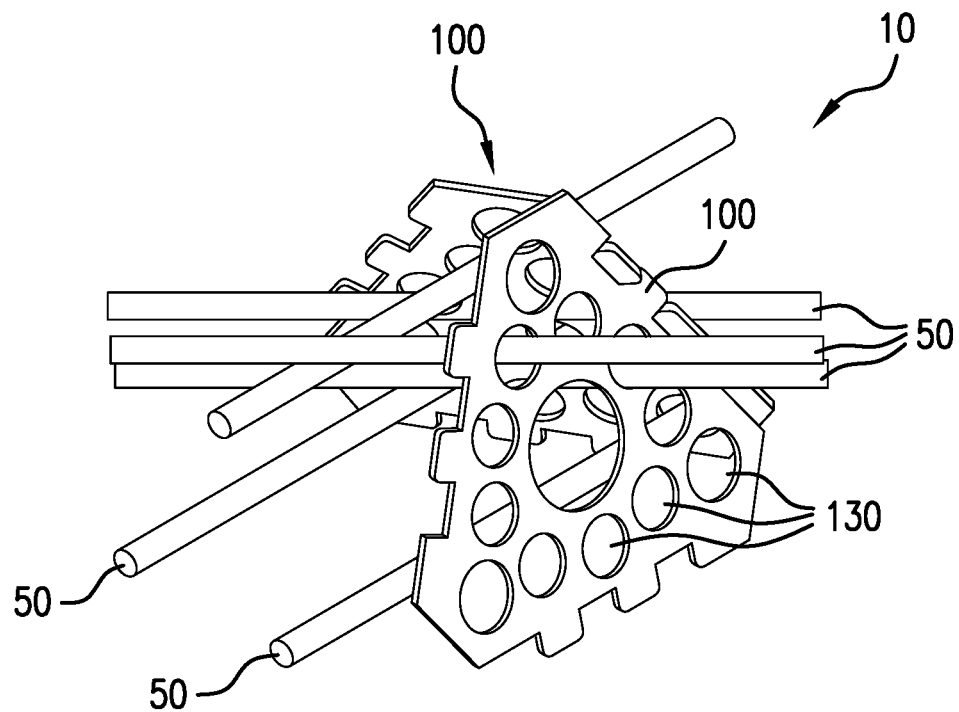
Figure 5C:
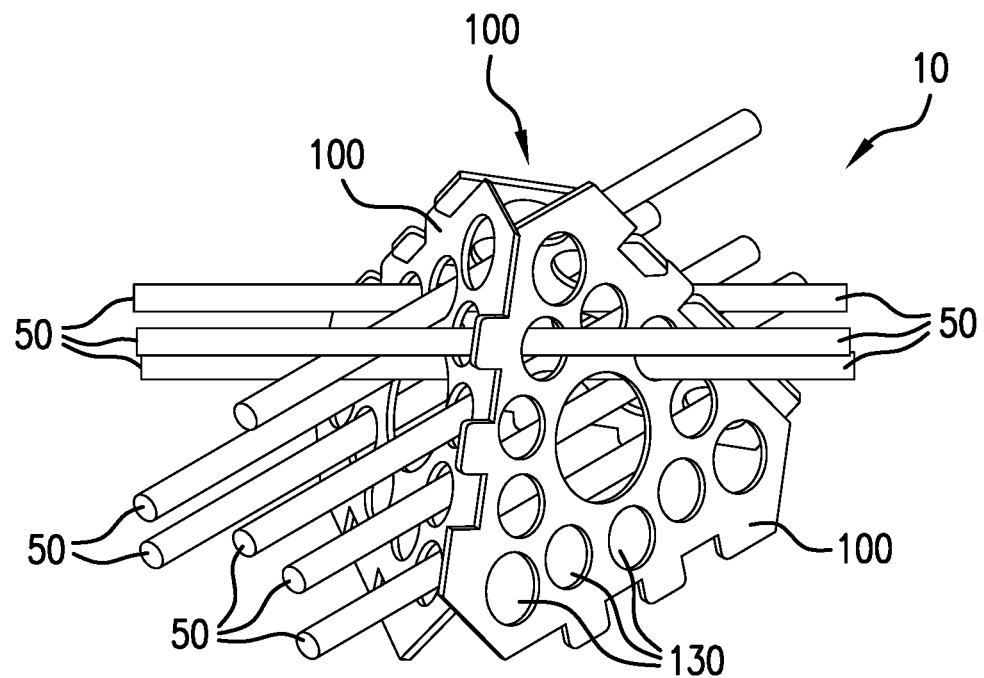
Figure 5D:
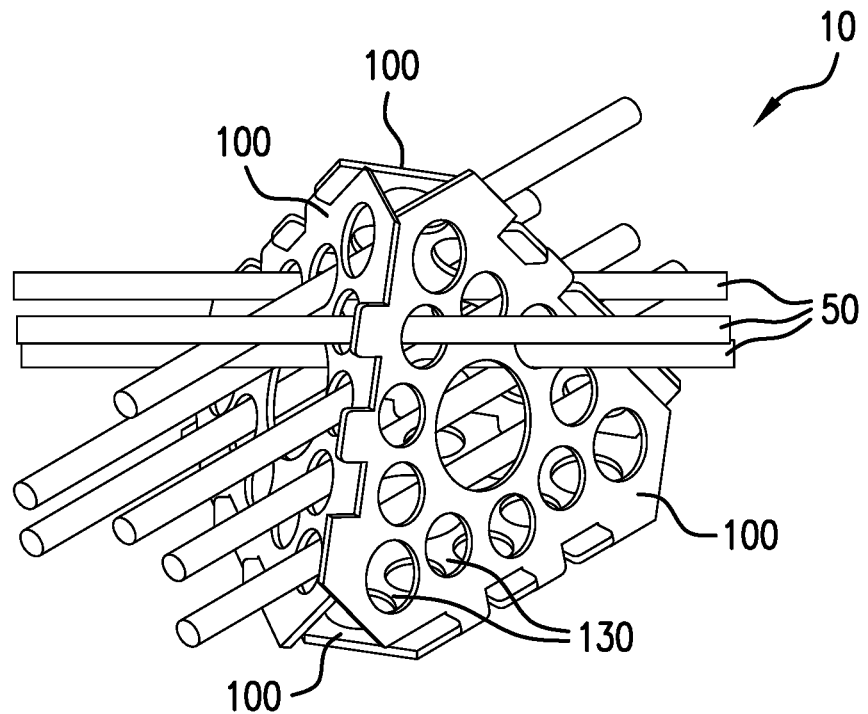
Figure 6:
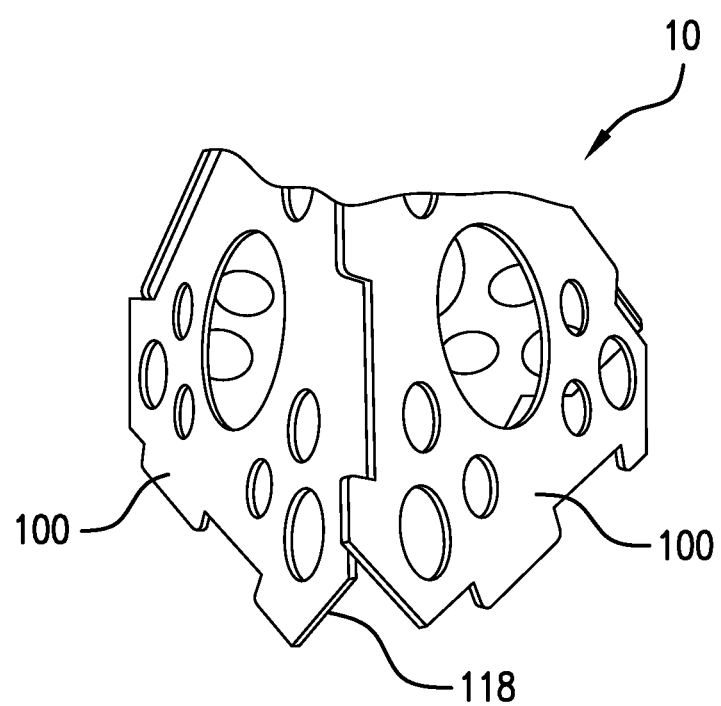
FIG. 6 illustrates a location at which to ignite the firestarter according to an aspect of the present invention

For example, if conditions are bad for fire (wet and windy, fuel sources are wet as well), three or four modular components 100 can be joined together to form a 4 sided pyramid 20, as shown in FIG. 5D. To do so, the user would join each side 112 of the four modular components 100 to one another by inserting the male joints 122 into the female joints 124, with one of the four modular components 100 forming a base. The remaining three components 100 are oriented in a mostly vertical position, and then can have fuel sources 50 inserted into their respected apertures 130. In an aspect, the fire assembly 10 is assembled such that each fuel source used can be inserted into two apertures on different modular components 100, and preferably apertures 130 that are found on the same level so to keep the fuel source substantially parallel to the bottom modular component 100. As the fuel sources 50 are inserted in such a fashion, the fuel sources 50 are found in a rising, crisscrossing fashion that exposes the most surface area possible to the budding flame.

In another aspect, three modular components 100 can be utilized to form a bottomless pyramid assembly 20 (FIG. 5C), similar to the pyramid discussed above. Fuel sources 50 can be inserted in the same manner as discussed above as well. Once the apertures 130 are filled, a user can use another fire starting source, such as a match, lighter, flint stick, etc., to light one of the modular components 100, preferably at corners 118 (see FIG. 6).

In either case (pyramid with three or four modular components 100), the pyramid structure firestarter assembly 10 provides many advantages, especially for inexperienced fire starters. First, the apertures 130 of the modular components 100 act as a template/guide for arranging fuel sources 50. Most individuals do not know how to properly space, stack and organize kindling to create a strong base for a fire. The firestarter assembly 10 guides them in that process and allows them to do so in an optimized and efficient fashion. Further, the pyramid provides optimized height and volume at minimal mass, both critical for assisting in building a fire. The height of the pyramid provides a place for the fire to climb, as budding fire naturally likes to climbs vertically. The apex of the pyramid also allows flames found on each modular component and fuel sources 50 to converge and maximize heat at that point. The base of the pyramid provides a base for lighting. The triangular base allows for 3 prominent places to light with a match or lighter. These prominent lighting areas are low in height and give the flame plenty of height to grow and climb up the pyramid as it naturally likes to do so. Further, the volume of the pyramid firestarter assembly 10 allows for more external fuel sources 50 to be inserted.

In addition, less than three modular components 100 can be utilized to start a fire. For example, if the user is well experienced in starting fires, or the conditions are very favorable to start a fire (e.g., very dry fuel sources 50 and ground and no wind), a singular or two modular component (s) 100 can be utilized as seen in FIGS. 5A and 5B. A user can put fuel sources 50 within the apertures 130 of the modular component 100, with a portion of the fuel sources 50 resting on the ground to hold up the modular component (s) 100. This can be done if an individual is low on modular components 100.

Figure 4:
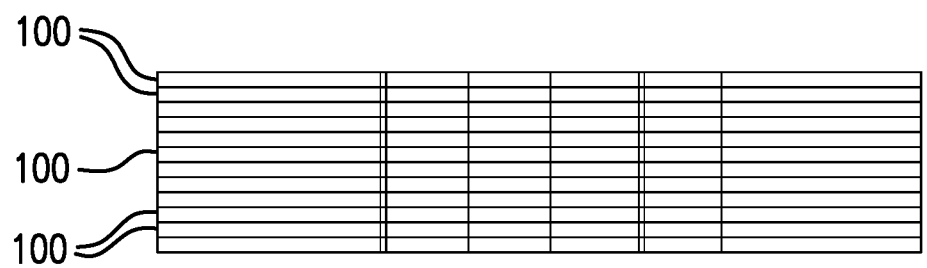
FIG. 4 is a side plan view of multiple modular components of FIG. 3 stacked on one another according to an aspect of the present invention.

In an aspect, the modular components 100 can be easily stored to take up less room when not being set up and used to start a fire, as shown in FIGS. 3-4. In such an aspect, the present disclosure may relate to a flat, single layer body 110 that when packed, stowed or not needed, maintains a flat and low profile shape that takes up minimal space. That is, an unassembled grouping of modular components 100 can be stacked together, taking up much less space than when assembled. The volume occupied can also be reduced if the modular components 100 are uniform. In addition, by rounding the corners 118, and having apertures, and making it collapsible, the unassembled firestarter assembly 10 weighs much less than other fire starters. In an aspect, the modular components 100 are also relatively light weight, offering advantages for outdoor activities. In an aspect, modular components 100 weigh approximately 1.4 grams each, though other weights could also be manufactured. In an aspect, outdoor activities consist of activities where lightweight options are advantageous, such as camping, hiking, and the like.

Figure 7:
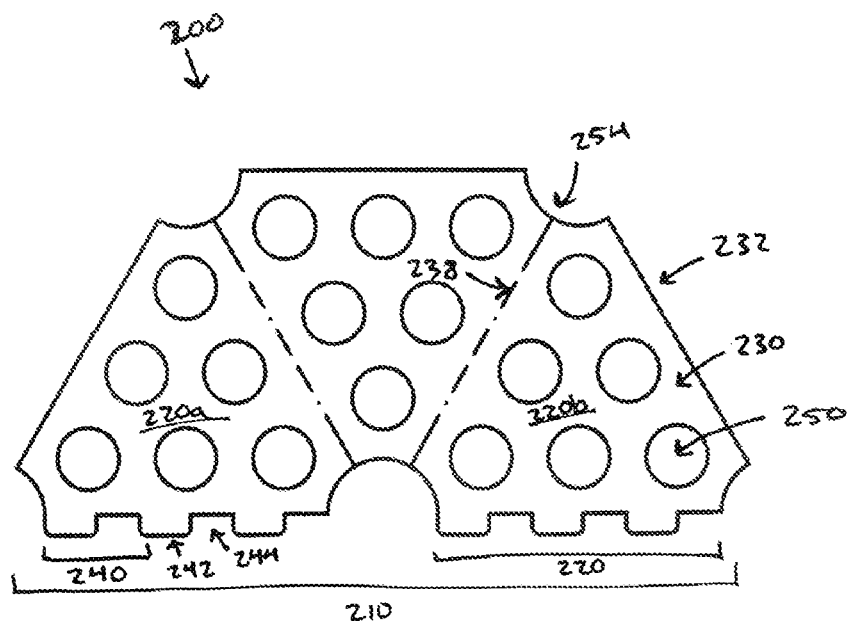
FIG. 7 shows a modular component 200 according to an aspect of the present invention.
Figure 8A:
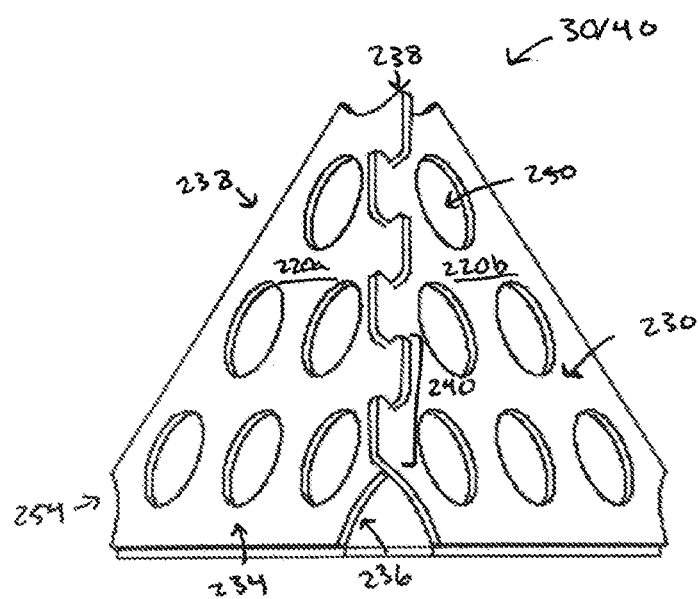
FIGS. 8A-8B shows a firestarter assembled using a foldable modular component 200 along a joint edge (FIG. 8A) and in a rear view (FIG. 8B).
Figure 8B:
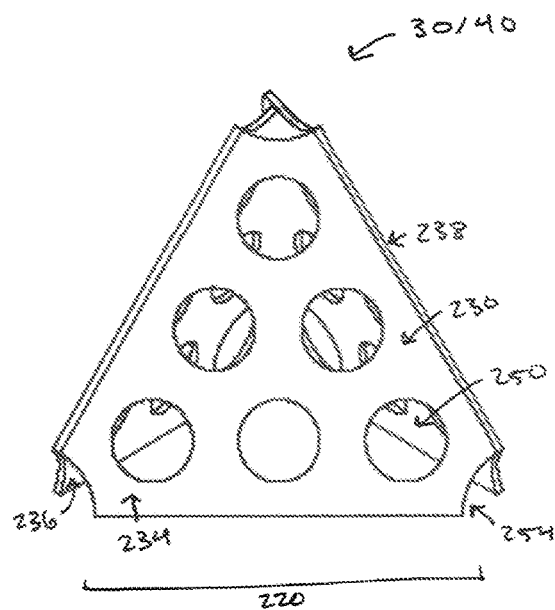

In an additional aspect, a firestarter assembly 30 may include an alternative modular component 200. This modular component 200 can be used with other modular components 100, but is configured to be used by itself to be sufficient to start a fire for any level of user. In such an aspect, the alternative modular component 200 can include a plurality of portions 210, as shown in FIG. 7. The plurality of portions 210 can include at least one, two, three, or more individual portions 220. Each portion 220 comprises similar elements of modular components 100 of FIGS. 1-6, as discussed above. In an aspect, each portion 220, as shown in FIG. 7, has a body 230. Each body 230 is a polygon, having at least three sides/edges 232. In addition, the body 230 includes a front surface 234 and a back surface 236, as shown in FIGS. 8A-8B. The bodies 230 of at least two portions 220 are configured to be joined with another portion 220 to form a polyhedron 40, as shown in FIG. 8A.

In such an aspect, the plurality of portions 210 is configured to be folded. In such an aspect, at least one or more edges 232 of a modular component 200 are shared by two or more individual portions 220 to form a connected/shared edge 238, as shown in FIGS. 8A-8B. In such an aspect, the plurality of portions 210 can be folded along connected/shared edges 238 at the sides 232 of individual portions 220. Shared/connected edges 238 may be perforated, slit at the top, or otherwise manufactured to provide ease of folding (see FIG. 8B to see folds at the connected/shared edge 238). In some aspects, shared/connected edges 238 that are manufactured to provide ease of folding may be so manufactured to more easily fold in one direction. As a non-limiting example, an indention could be made along an edge 238 on only one side of a body 230. This allows the body edge 238 to be more easily folded on the indented side. In such aspects, at least two portions 220 of the modular component 200 include coupling means 240 on one or more side 232. The two portions 220 are usually the outer two portions 220a, b of the modular component 200, as shown in FIG. 7. Coupling means 240 allow a side 232 of one portion 220a to be joined to a side 232 of another portion 220b of a modular component 200 when folded. In an aspect, the coupling means 240 can include a joint system 240, as shown in FIG. 7. For example, the joint system 240 can be made of multiple male joints 242 along sides 232 that form female joints 244. The male joints 242 of a first portion 220a are configured to be received by female joints 244 of a second portion 220b, and the male joints 242 of the second portion 220b are configured to be received by the female joints 244 of the first portion 220a, as shown in FIGS. 7 and 8A. In such aspects, male joints 242 and female joints 244 of portions 220a,b align quickly and easily to combine in order to form a three-dimensional housing. As shown in FIG. 7, each side 232 of the outer portions 200a,b can be configured to have three male joints 242 and three female joints 244, though in other embodiments, various other combinations, in number and in types of joints, can be utilized.

In similar aspects as described above, a firestarter assembly 30 set up in a polyhedron using an alternative modular component 200 provides many advantages, especially for inexperienced fire starters. Similar to the modular component 100, the alternative modular component 200 includes apertures 250 throughout each portion 220 of the plurality of portions 210, as shown in FIGS. 7 and 8A-B. The apertures 250 of the modular component 200 act as a template/guide for arranging fuel sources 50 providing advantages to the user. As discussed above, the polyhedron 40 provides optimized height and volume at minimal mass, both critical for assisting in building a fire. All benefits associated with modular components 100 also relate to the alternative modular component 200. The modular component 200 further comprises corners 254 in each portion 220 of the plurality of portions 210. Further, in some of these instances, corners 254 of the portions 220 can have a rounded shape, allowing for easier assembly, and additional benefits discussed above. Once the apertures 250 are filled, a user can use another fire starting source, such as a match, lighter, flint stick, etc., to light one of the modular components 200, preferably at corners 254.

Figure 9:
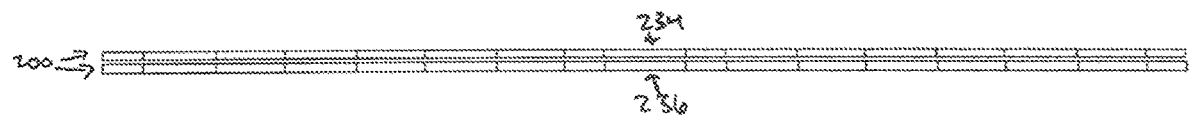
FIG. 9 displays a side view of foldable modular components 200 configured to be stacked.

In an aspect, the modular components 200 can be easily stored to take up less room when not being set up and used to start a fire, as shown in FIG. 9. In such an aspect, the present disclosure may relate to a flat, single plurality of portions 210 that when packed, stowed or not needed, maintains a flat and low profile shape that takes up minimal space. That is, an unassembled grouping of modular components 200 can be stacked together, taking up much less space than when assembled. The volume occupied can also be reduced if the modular components 200 are uniform such as with simple, matching geometric portions. In addition, by rounding the corners 254, and having apertures 250, and making it collapsible, the unassembled firestarter assembly 30 weighs much less than other fire starters. In an aspect, the modular components 200 are also relatively light weight, offering advantages for outdoor activities. In an aspect, modular components 200 weigh approximately 4.2 grams each, though other weights could also be manufactured. In an aspect, outdoor activities consist of activities where lightweight options are advantageous, such as camping, hiking, and the like. In all such aspects, a stored, collapsed assembly 10 can be quickly assembled or disassembled to allow for either use or storage immediately.

Figure 10A:
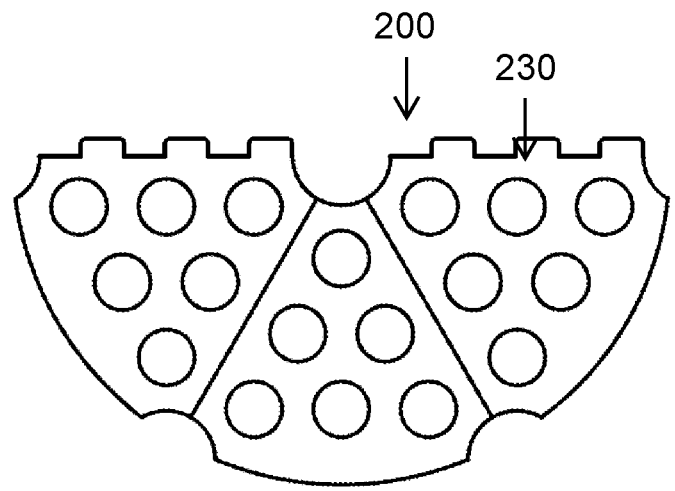
FIGS. 10A-10G display non-limiting examples of aspects of the present disclosure incorporating bodies of various geometries.
Figure 10B:
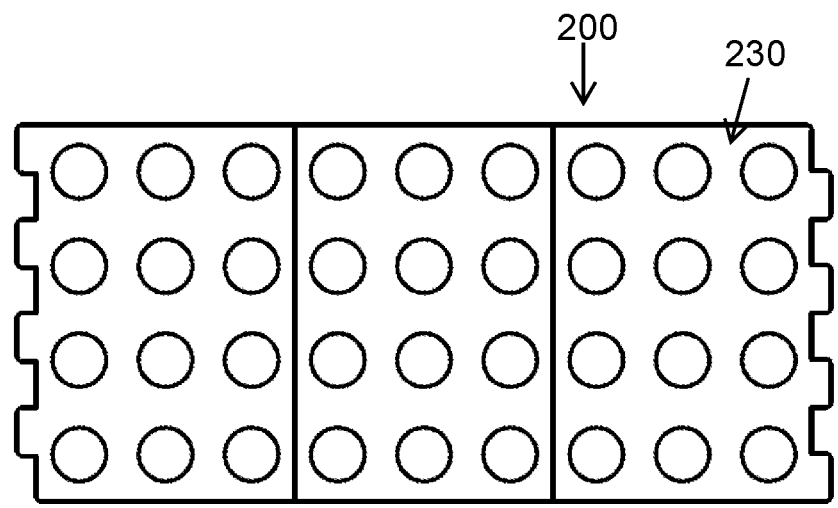
Figure 10C:
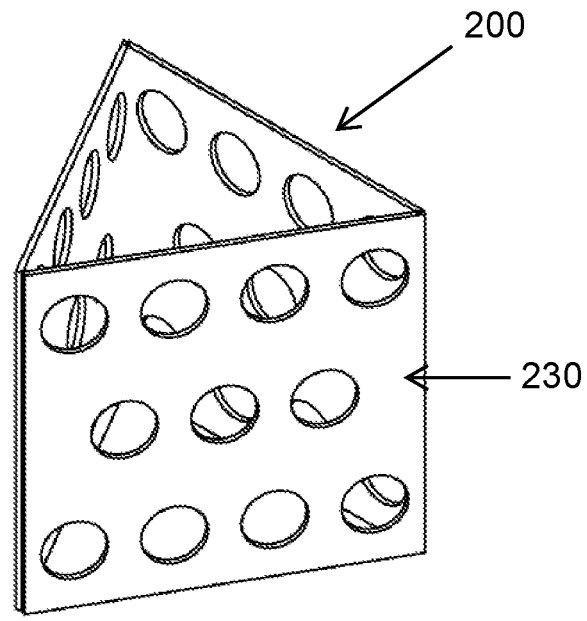
Figure 10D:
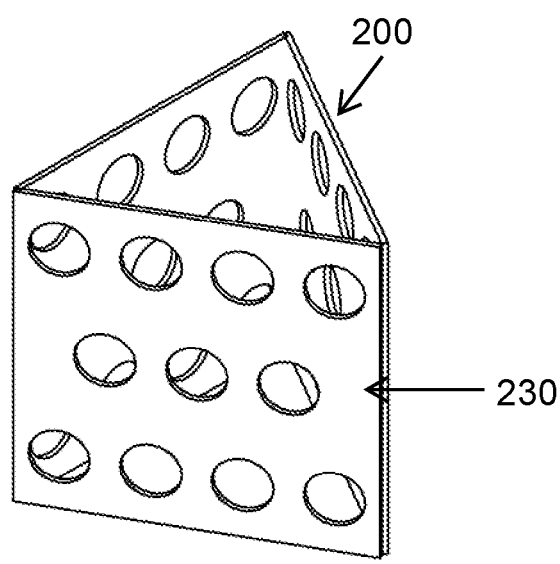
Figure 10E:
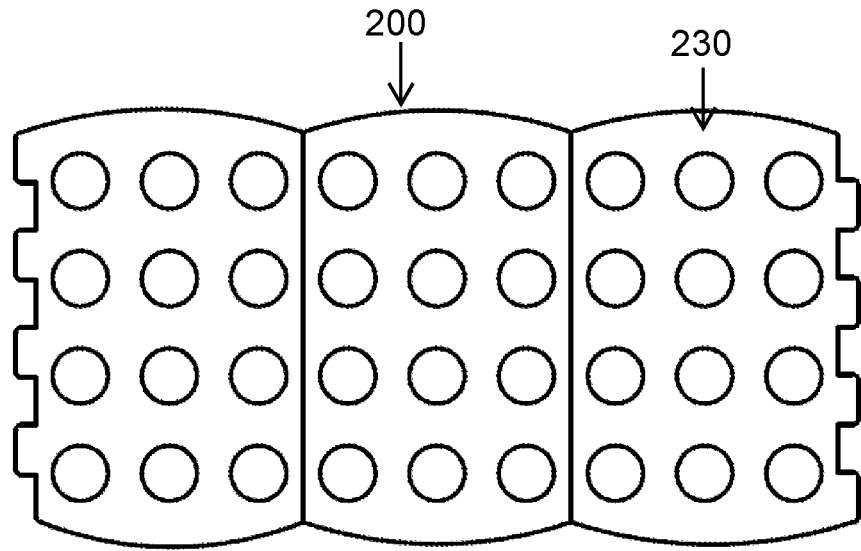
Figure 10F:
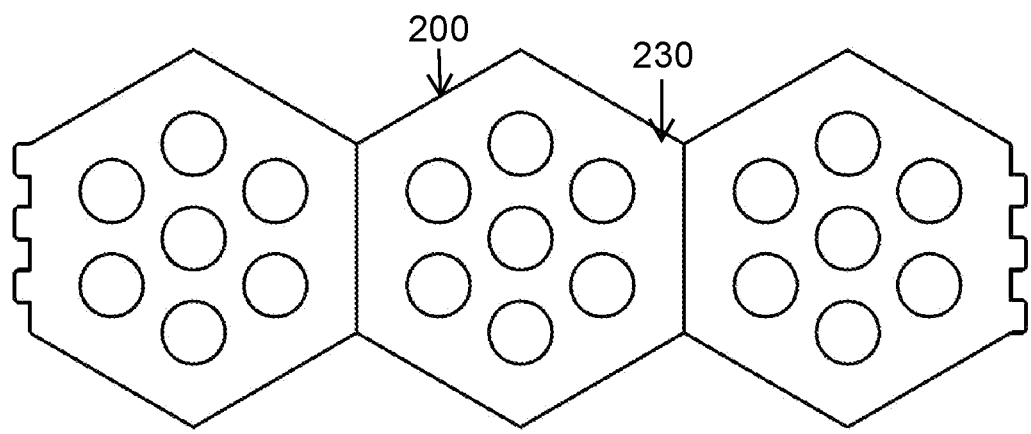
Figure 10G:
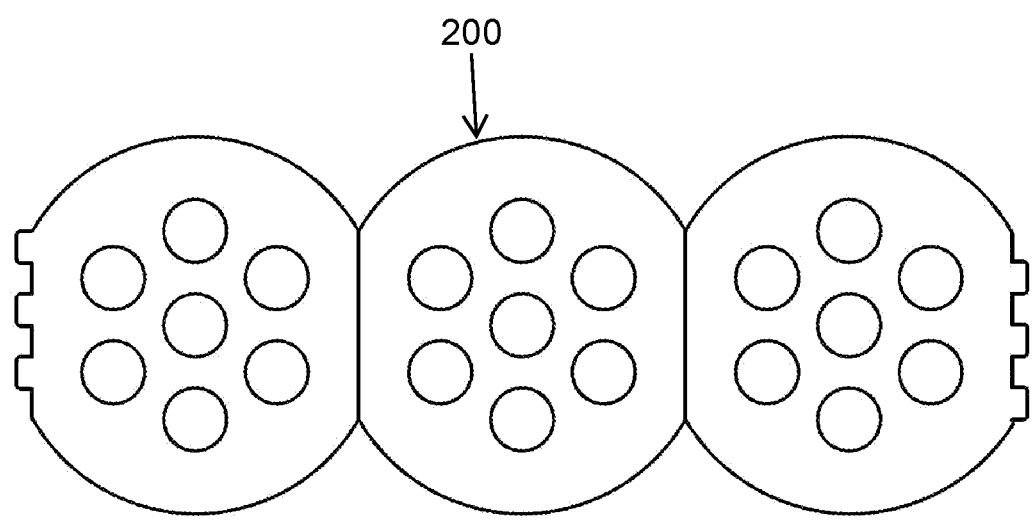

As described herein, bodies 110, 230 include but are not limited to a variety of shapes. FIGS. 10A-10G display a variety of examples of shapes capable of forming various two dimensional and three dimensional structures including but not limited to a curved tetrahedral pyramid (FIG. 10A), triangular prism (FIGS. 10B-10D), curved triangular prism (FIG. 10E), hexagonal prism (FIG. 10F), and a round/modified circular/oval prism (FIG. 10G). In some such aspects, a constructed assembly 10 may include a closed top and closed base (FIG. 8A), an open top and open base (FIG. 10C), or both (FIG. 5C).

Having thus described exemplary embodiments of the present invention, it should be noted by those skilled in the art that the disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A firestarter assembly consisting of one modular component, the modular component consisting of:
   a. a first portion connected to a second portion, and a third portion connected to the second portion, wherein each portion comprises:
      i. a body with at least three sides, wherein at least one side includes a shared side that connects to another body of another portion;
      ii. a plurality of apertures through the body; and
   b. coupling means used to connect the first portion to the third portion, wherein the modular component is configured to convert from a flat position to a three-dimensional position to assist in fire starting activities by engaging the coupling means to connect the first portion to the third portion, wherein at least one of the three sides of each body forms an open base to rest on a surface, the three-dimensional position absent a base portion to engage the surface.

2. The firestarter assembly of claim 1, wherein at least one side of each portion is directly connected to at least one side of another portion to form a first connected edge between the first portion and the second portion, and a second connected edge between the second portion and the third portion.

3. The firestarter assembly of claim 2, wherein the first and second connected edges are configured to fold to assist the engagement of the coupling means.

4. The firestarter assembly of claim 3, wherein the first and second connected edges comprises scoring or one or more slits or perforations to further enable folding of the first, second, and third portions to form the firestarter assembly.

5. The firestarter assembly of claim 1, wherein the modular component is made of a fire conducive material or a material that is treated to be fire conducive.

6. The firestarter assembly of claim 1, wherein the coupling means comprise a joint, the joint comprising:
   i. male joints and female joints on sides of the first portion;
   ii. configured to engage with other corresponding female and male joints of the third portion to allow the first and third portions to couple to one another to form the three-dimensional position.

7. The firestarter assembly of claim 1, wherein the first, second, and third portions are equilateral triangles and allow the three-dimensional position to form at least a three-sided equilateral pyramid when the coupling means are joined together.

8. The firestarter assembly of claim 7, wherein the portions comprise tapered corners to allow for ease of ignition.

9. The firestarter assembly of claim 1, wherein each portion is an equilateral polyhedron and the first set and the second set of apertures are arranged along each portion of the modular component in substantially similar locations so that when the portions are arranged through folding the first set and the second set of apertures are aligned with the same first and second sets of apertures of a corresponding portion.

10. The firestarter assembly of claim 1, wherein the three-dimensional position is a three-sided three-dimensional housing that includes an open top.

11. A firestarter assembly consisting of one foldable modular component made of a fire conducive material and configured to fold into a three-dimensional housing, the modular consisting of:

a. a first portion connected to a second portion and a second portion connected to a third portion, wherein each portion comprises:
  i. a body with at least three sides; and
  ii. a plurality of apertures through the body; and
b. coupling means used to connect the first portion to the third portion, the coupling means comprising corresponding male and female joints on a first side of the first portion and a first side of the third portion,
  wherein a second side of first portion is connected to a first side of the second portion to form a first connected edge and a second side of the second portion is connected to a second side of the third portion to form a second connected edge, wherein the first and second connected edges are scored to fold, and
wherein the modular component is configured to convert from a flat position to a three-sided three-dimensional housing for placing on a surface to assist in fire starting activities by folding the first, second, and third portions at the first and second connected edges and joining the male and female joints of the first and third portions together.

12. The firestarter assembly of claim 11, wherein the plurality of apertures are configured to receive and hold fuel sources above the surface.

13. The firestarter assembly of claim 11, further configured to assist in fire starting activities without the need of additional fuel sources.

14. A method of using a firestarter assembly to start a fire comprising:
a. providing the firestarter assembly, the firestarter assembly consisting of one modular component, the modular component consisting of;
  i. a first portion connected to a second portion, and a third portion connected to the second portion, wherein each portion comprises:
    1. a body with at least three sides; and
    2. A plurality of apertures through the body of the portion; and
  ii. coupling means used to connect the first portion to the third portion, wherein the modular component is configured to convert from a flat position to a three-dimensional shape without a base portion to assist in fire starting activities, wherein the three-dimensional shape is formed with an open top and an open base, the open base formed from one of the at least sides of the first portion, the second portion, and the third portion;
b. setting up the firestarter assembly; and,
c. igniting the firestarter assembly with a fire-starting source.

15. The method of claim 14, wherein the coupling means comprises a joint, the joint comprising:
  i. at least one male joint; and
  ii. at least one female joint, wherein the at least one mail joint and the at least one female joint are oriented in the same fashion along each side and are configured to engage with other corresponding female and male joints of other modular components.

16. The method of claim 15, wherein setting up the firestarter assembly further comprises:
a. folding one or more portions of the plurality of portions along the connected edges;
b. engaging the joint of first portion and the third portion; and,
c. configuring the folded firestarter assembly to be the three-dimensional shape to be placed on a surface.

17. The method of claim 14, wherein one or more fuel sources are inserted into the apertures of the firestarter assembly.

18. The method of claim 14, wherein the firestarter assembly is ignited with no fuel sources inserted into the apertures of the firestarter assembly.

* * * * *